May 7, 1935.  F. C. W. WILKINSON  2,000,653
HEAT EXCHANGE APPARATUS
Filed Dec. 21, 1933

INVENTOR
F. C. W. Wilkinson
BY
H. F. Oberwroth
ATTORNEY

Patented May 7, 1935

2,000,653

UNITED STATES PATENT OFFICE 2,000,653

HEAT EXCHANGE APPARATUS

Francis Clarence Walter Wilkinson, Burnham, England, assignor of one-half to Crane Packing Limited, Slough, England, a British company, and one-half to Crane Packing Company, Chicago, Ill., a corporation of Illinois Application December 21, 1933, Serial No. 703,479
In Great Britain December 21, 1932

6 Claims. (Cl. 257—236)

This invention relates to the fitting of the tubes of condensers and similar multi-tubular apparatus and has particular reference to the fixing of one end of each of a nest of tubes in a tube-sheet whilst the other end is fitted with freedom of longitudinal expansion in another tube-sheet.

In such apparatus it is known to fix one end of each tube in a shouldered aperture in the tube-sheet by means of two wide oppositely tapered rings adapted by being driven the one over the other to exert a resilient band-like grip upon the portion of the tube located in the aforesaid aperture, as fully described and shown in my Patent 1,936,815, issued November 28, 1933. It has also been proposed to shape conically a portion of the aperture in the tube sheet and to force a similarly coned packing ring of relatively soft metal, such as white metal, against the conical surface by means of another ring forced behind the first by a ferrule.

Under some circumstances there may not be adequate room for adopting the above-mentioned type of fitting comprising two wide oppositely tapered rings in the annular space between the tube surface and the aperture wall, as for example is the case if the tube sheet is exceptionally thin. On the other hand it is important to avoid bi-metallic electrolytic action at the joint or fitting and therefore to avoid using a metal ring or rings of different composition from that of the tubes and tube sheet.

According to the present invention the tube-guiding surface of the shoulder in each tube sheet aperture is conically shaped and is engaged by a correspondingly tapered ring of the same composition as that of the tube and tube sheet but of less resistance to radial contraction pressure so that when endwise pressure is exerted on the ring it will yield resiliently more than the tube sheet and will therefore be contracted radially into tight gripping relation with the tube surface.

The end pressure is exerted by a ferrule engaging in the tube sheet aperture and making abutting contact direct with the rear end of the tapered ring or with an intervening spacing ring. In all cases the length of the ring is preferably so related to the length of the ferrule that the outer end of the latter, which is preferably flared, is finally flush with the external face of the tube sheet. The internal diameter of the ferrule is, generally speaking, the same as the internal diameter of the tube so as to ensure undisturbed flow along the tube. This ferrule may if desired be internally stepped in diameter so that the forward or inner end of the ferrule overlaps a portion of the end of the tube before abutting against the rear or outer end of the main ring or of the intervening spacing ring; alternatively the forward portion of this ferrule may be not only of greater internal diameter than the main portion but of tapered formation so as to have a wedge-like effect on a correspondingly tapered rear portion of the main ring or of the intervening spacing ring. When the ferrule is unscrewed in either of the alternative constructions, the main ring relaxes its hold on the tube, permitting the same to be withdrawn without damage to the several parts of the fitting. Thus ready renewal of the tubes is made possible and at low cost. In addition, a tight joint is assured with an all-metal fitting.

In order that the invention may be clearly understood and readily carried into effect, the same will now be described more fully with reference to the accompanying drawing in which:—

Figure 1:
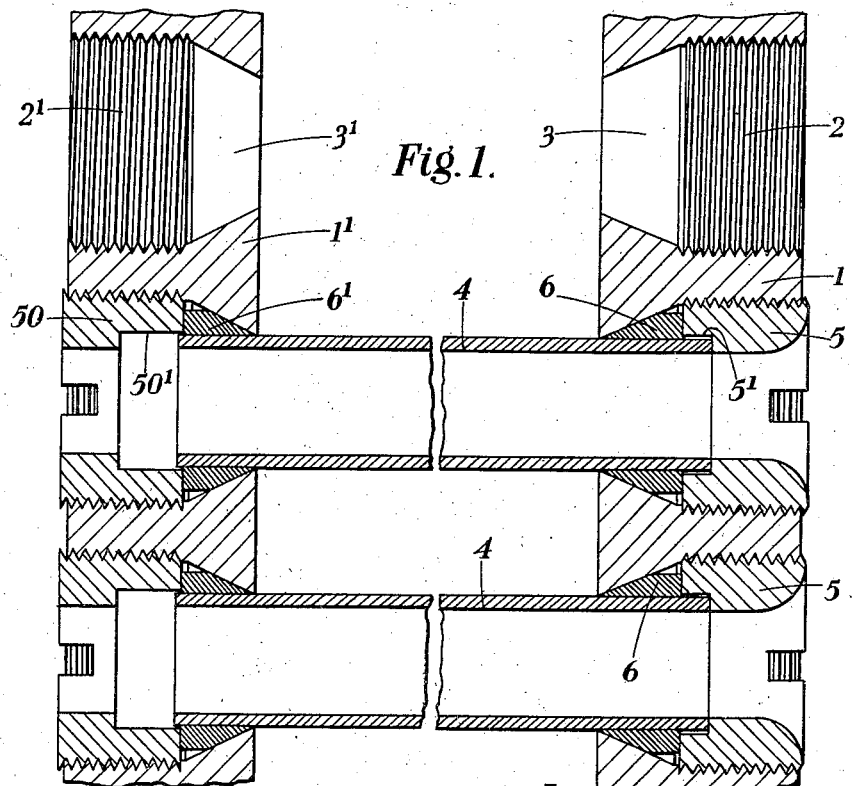
Figure 1 is a sectional view of parts of two tube sheets of a multi-tubular condenser and of two tubes fitted therein in accordance with the present invention.

Referring first more particularly to Figure 1 it is seen that each tube sheet aperture in the front or intake tube sheet I comprises an internally screw-threaded cylindrical space 2 and a tapered or frusto-conical space 3 which tapers gradually from the screw threaded portion to the inner wall of the tube sheet. Each aperture in the rear or discharge tube sheet I' comprises spaces 2' and 3' similar to those of the aperture in the front sheet, but the frusto-conical space 3 in the front tube sheet I is longer than the space 3' in the rear tube sheet I'. The front end of each tube 4 projects into the tube sheet aperture from the rear surface of the front tube sheet I and is seated in a stepped portion 5' of a ferrule 5. In the space between the tube and the frusto-conical surface of the tube sheet aperture is a band or ring 6 cylindrical internally to fit slidably over the tube and conical externally to engage the frusto-conical surface of the tube sheet aperture. By screwing the ferrule 5 into the cylindrical screw-threaded portion of the tube sheet aperture, the ring or band 6 is forced against the frusto-conical surface of the tube sheet aperture and is thereby contracted radially into band-gripping contact with the tube.

The tube, the tube sheet, the ring and the ferrule are preferably all of the same composition so as to avoid electrolytic action between them, but the ring 6 may be physically somewhat more resiliently yieldable than the other parts, as for example by being annealed, so as to be relatively yieldable under the contracting influence of the tapering formation of the aperture when the ring is being driven by the ferrule 5.

The ferrule 5 is preferably flared at its mouth as shown and its internal diameter is preferably equal to the internal diameter of the tube 4 so that there is no break or irregularity of surface offered to the flow of fluid through the ferrule and along the tube.

The lengths of the tube and ring respectively are such that when the ferrule is screwed into position sufficiently to tighten the ring firmly onto the tube, the rim of the flared end of the ferrule is just about flush with the external face of the tube sheet.

The method of assembly is for the rear end of the tube to be free when the front end is seated in the stepped portion of the ferrule so that as the ferrule is screwed into position the tube is free to retreat with the advancing ferrule until the ring 6 grips it. Thus a tight joint is provided, without the use of a gasket or packing, sufficient to seal against leakage of air and water and to maintain an almost perfect vacuum, as in the case of steam surface condensers for example.

The rear end of each tube can be secured in the respective rear tube sheet aperture in any convenient manner, for example by ordinary packing rings and a ferrule, but preferably by the means shown in Figure 1 where the rear end of each tube is shown as gripped by a tapered band or ring 6' thrust into gripping position by a rear ferrule 50. The rear ferrule is stepped as at 50' so as not to obstruct the rear end of the tube, thus permitting the tube to expand and contract freely. The longer grip of the ring 6 at the front end relatively to the grip of the ring 6' at the rear end enables the tube to expand or contract even when the ring 6' has been tightened. In other words, although the tube is gripped firmly at each end, the grip is stronger at the inlet end than at the outlet end, thus permitting the outlet end to slide back and forth within the ring 6' instead of causing the tube as a whole to bend or bow as would be the case where both ends were rolled into the tube sheets without being permitted any movement whatever. In this way, with the construction described, a continuous smooth inner surface is presented at the inlet end of the tube to the water flowing through the same and the advantage of the rounded outer end of the ferrule 5 is not lost. The change in diameter at the outlet end of the tube where the ferrule presents an enlargement 50' is no particular detriment. If for any reason the outlet or left hand end of any of the tubes should adhere to the ring 6' so tightly as to fail to slide therein, and the heated tube should contract with sufficient force to cause the inlet end to slide through its ring 6, such movement would not break the seal at the inlet end. The reason for this is that the right hand end of the tube projects sufficiently beyond the ring 6 to enable it to be withdrawn considerably from the shoulder 5' on the ferrule without being pulled out of said ring, or, in fact, without being drawn even part way through said ring. Even in the latter case the tight seal is maintained effectively by the left hand end or thin wedge shaped portion of said tapering ring. The fact that the same type of fitting can be used at both ends of the tube is an important advantage.

The ring 6' and ferrule 50 are preferably of the same composition as the tube and tube sheet just as in the case of the front ring and ferrule. Owing to the composition and physical character of the rings 6, 6', and ferrules 5, 50, they and the tubes can be removed and replaced repeatedly if desired.

Figure 2:
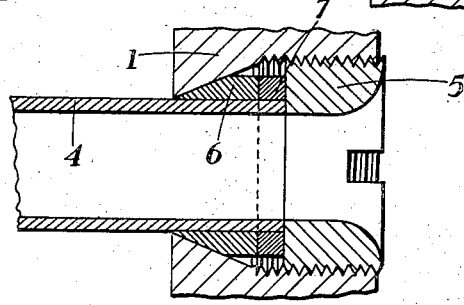
Figure 2 is a sectional view of a modified form of fitting and Figure 3 is a similar view of a further modification.

In Figure 2 the construction is similar to that shown at the right hand portion of Figure 1 excepting that an intervening ring 7 is shown between the ring 6 and ferrule 5.

Figure 3:
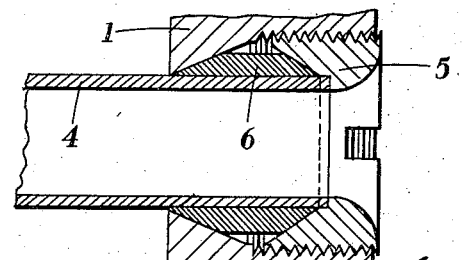

In Figure 3 the ferrule is stepped to take the end of the tube but is also tapered internally and the forward end of the ring 6 is tapered rearwardly as well as forwardly so as to co-operate with the rearward taper of the ferrule as shown and thereby increase the band-like grip of the ring upon the tube.

What I claim is:—

1. A multi-tubular heat exchange apparatus comprising a front tube sheet, a rear tube sheet, and tubes extending between and fitting at their ends into apertures in said sheets, each of said apertures having a cylindrical portion and a frusto-conical portion, a ferrule engageable in each cylindrical portion of an aperture, and a band slidably fitting over the tube and externally coned to fit against said frusto-conical portion of the aperture, the band on the front end of the tube being longer than the band on the rear end of the tube, whereby said tube may slide through said rear band, upon expansion or contraction of said tube, due to temperature changes.

2. A multi-tubular heat exchange apparatus according to claim 1, the ferrules in the apertures of the front tube-sheet being of the same internal diameter as that of the tubes but stepped in diameter to provide a clearance, the front ends of said tubes projecting beyond said bands into said clearance.

3. In a multi-tubular heat exchange apparatus, a tube-end fitting comprising a tube sheet having for each tube end an aperture having a cylindrical entrant portion and a frusto-conical rear portion, extending from the rear of said cylindrical entrant portion to the rear surface of said tube sheet, a band having a cylindrical internal surface slidably fitting over the tube end and a frusto-conical external surface registrable with said rear portion and a ferrule engageable in the cylindrical portion of said tube-sheet aperture to force said band inwardly and cause it to grip said tube end, the tube, the tube sheet, the band and the ferrule all being of substantially the same composition.

4. A steam surface condenser having a tube sheet with screw threaded recesses in its outer face, outwardly flaring openings in the inner face of said tube sheet, each communicating with one of said recesses, tubes made of a composition of metals having good heat conducting properties and arranged each with one end received in one of said apertures, a cone shaped ring surrounding each tube end with its small end near the inner face of said tube sheet and having normally a sliding fit over the tube end, a screw threaded ferrule in said screw threaded aperture engaging the large end of said ring for forcing the same inwardly thereby contracting it to cause it to grip said tube end firmly, said ring and ferrule being made of the same material as said tubes, to reduce electrolytic action, said ring being flexible whereby when said ferrule is unscrewed and the pressure relieved, said ring will relax its grip on said tube and permit withdrawal thereof and also permit reuse of said rings.

5. A steam surface condenser having a tube sheet with screw threaded recesses in its outer face, outwardly flaring openings in the inner face of said tube sheet, each communicating with one of said recesses, tubes made of a composition of metals having good heat conducting properties and arranged each with one end received in one of said apertures, a cone shaped ring surrounding each tube end with its small end near the inner face of said tube sheet and having normally a sliding fit over the tube end, a screw threaded ferrule in said screw threaded aperture having a shouldered recess to receive the end of said tube, the end wall of said ferrule engaging the large end of said ring to force the same into said flaring opening and contract it about said tube, said inner ring being flexible whereby when said ferrule is unscrewed and the pressure relieved, said ring will relax its grip on said tube and permit withdrawal thereof and also permit reuse of said rings.

6. A steam surface condenser having a tube sheet with apertures therein, the outer portions of which are cylindrical and provided with screw threads and the inner portions of which have a gradual taper, tubes arranged each with one end received in one of said apertures, a cone shaped metal ring surrounding each tube end and fitting said tapered portion, said tube ends projecting outwardly through said rings, whereby said tubes if contracted in length by cooling, may withdraw their ends inwardly a substantial fraction of an inch without drawing the same into said rings, a shouldered screw threaded ferrule in said screw threaded cylindrical portion and of a thickness sufficient to cause the shoulder therein to engage the end of said tube, and also to force said ring against said tapering portion thereby contracting said ring to cause it to frictionally grip said tube firmly, said ring being made of flexible metal whereby when said ferrule is unscrewed and the pressure relieved, said ring will relax its grip on said tube and permit withdrawal thereof.

FRANCIS CLARENCE WALTER WILKINSON.